United States Patent
Delaney et al.

(10) Patent No.: US 6,374,289 B2
(45) Date of Patent: Apr. 16, 2002

(54) DISTRIBUTED CLIENT-BASED DATA CACHING SYSTEM

(75) Inventors: Hubert Delaney, Wilton, CT (US); Adi Ruppin, Ramat Gan (IL); Lior Hass, Tel Aviv (IL); Ofer Faigon, Jerusalem (IL)

(73) Assignee: Backweb Technologies, Ltd., Ramat Gan (IL)

( * ) Notice: Subject to any disclaimer, the term of this patent is extended or adjusted under 35 U.S.C. 154(b) by 0 days.

(21) Appl. No.: 09/817,953

(22) Filed: Mar. 26, 2001

Related U.S. Application Data

(63) Continuation of application No. 09/166,686, filed on Oct. 5, 1998, now abandoned.

(51) Int. Cl.$^7$ ............................................. G06F 13/00
(52) U.S. Cl. ........................................ 709/203; 709/238
(58) Field of Search .................................. 709/200–253

(56) References Cited

U.S. PATENT DOCUMENTS

| | | | |
|---|---|---|---|
| 5,151,989 A | 9/1992 | Johnson et al. ............... | 707/10 |
| 5,261,069 A | 11/1993 | Wilkinson et al. ........... | 711/145 |
| 5,689,708 A | 11/1997 | Regnier et al. .............. | 709/229 |
| 5,729,689 A | 3/1998 | Allard et al. ................ | 709/228 |
| 5,835,720 A | 11/1998 | Nelson et al. ............... | 709/224 |
| 5,864,854 A | 1/1999 | Boyle ........................... | 707/10 |
| 5,884,046 A | 3/1999 | Antonov ....................... | 709/238 |
| 6,002,852 A | 12/1999 | Birdwell et al. ....... | 395/200.363 |
| 6,003,087 A | 12/1999 | Housel, III et al. ......... | 709/229 |
| 6,018,766 A | 1/2000 | Samuel et al. ............... | 709/218 |
| 6,021,426 A | 2/2000 | Douglis et al. .............. | 709/200 |

*Primary Examiner*—David Wiley
(74) *Attorney, Agent, or Firm*—Fliesler, Dubb, Meyer & Lovejoy LLP

(57) ABSTRACT

A system and method for enabling data package distribution to be performed by a plurality of peer clients connected to each other through a network, such as a LAN (local area network). Each peer client can obtain data packages from each other or from an external server. However, each peer client preferably obtains data packages from other peer clients, rather than obtaining data packages from the external server.

23 Claims, 9 Drawing Sheets

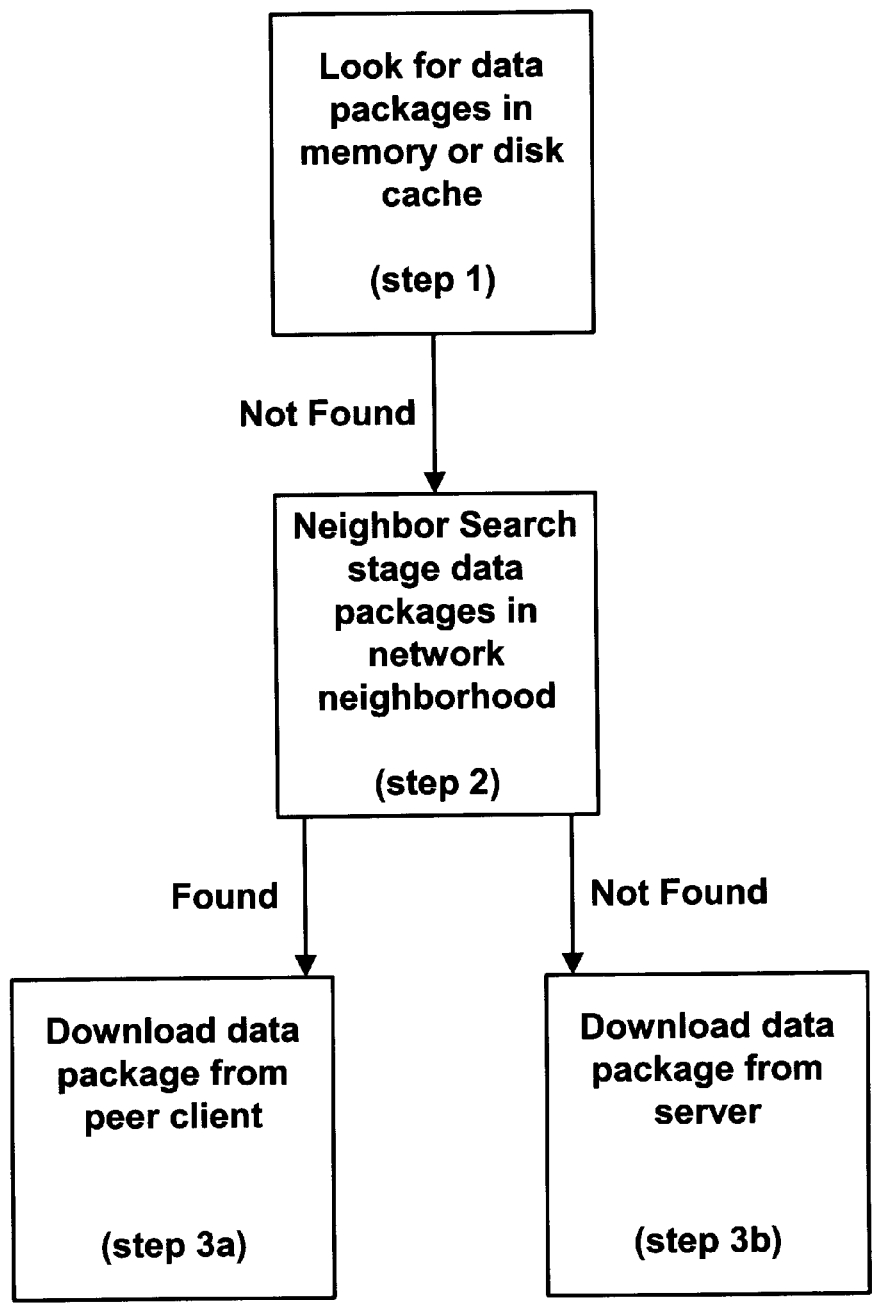
FIGURE 1B: Downloading Process

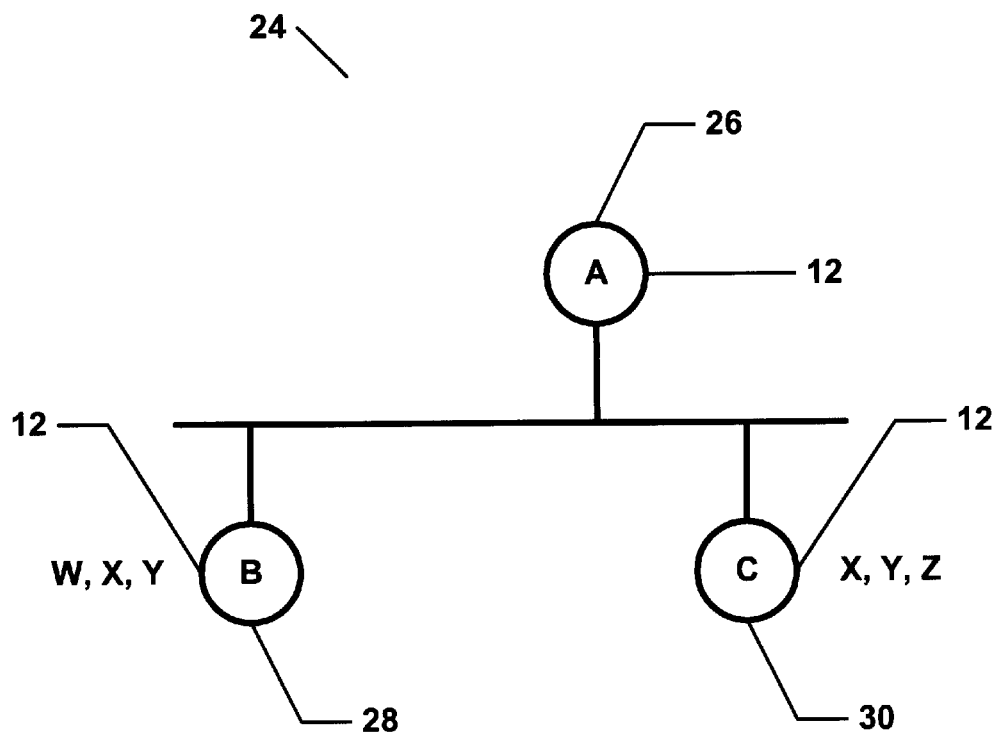
FIGURE 2A: Request-response example

| PVN | Digest 1, Digest 2 |

FIGURE 2C: Request message

| PVN | Digest 1, Digest 2, ...Digest N | TCP Port |

FIGURE 2D: Response message

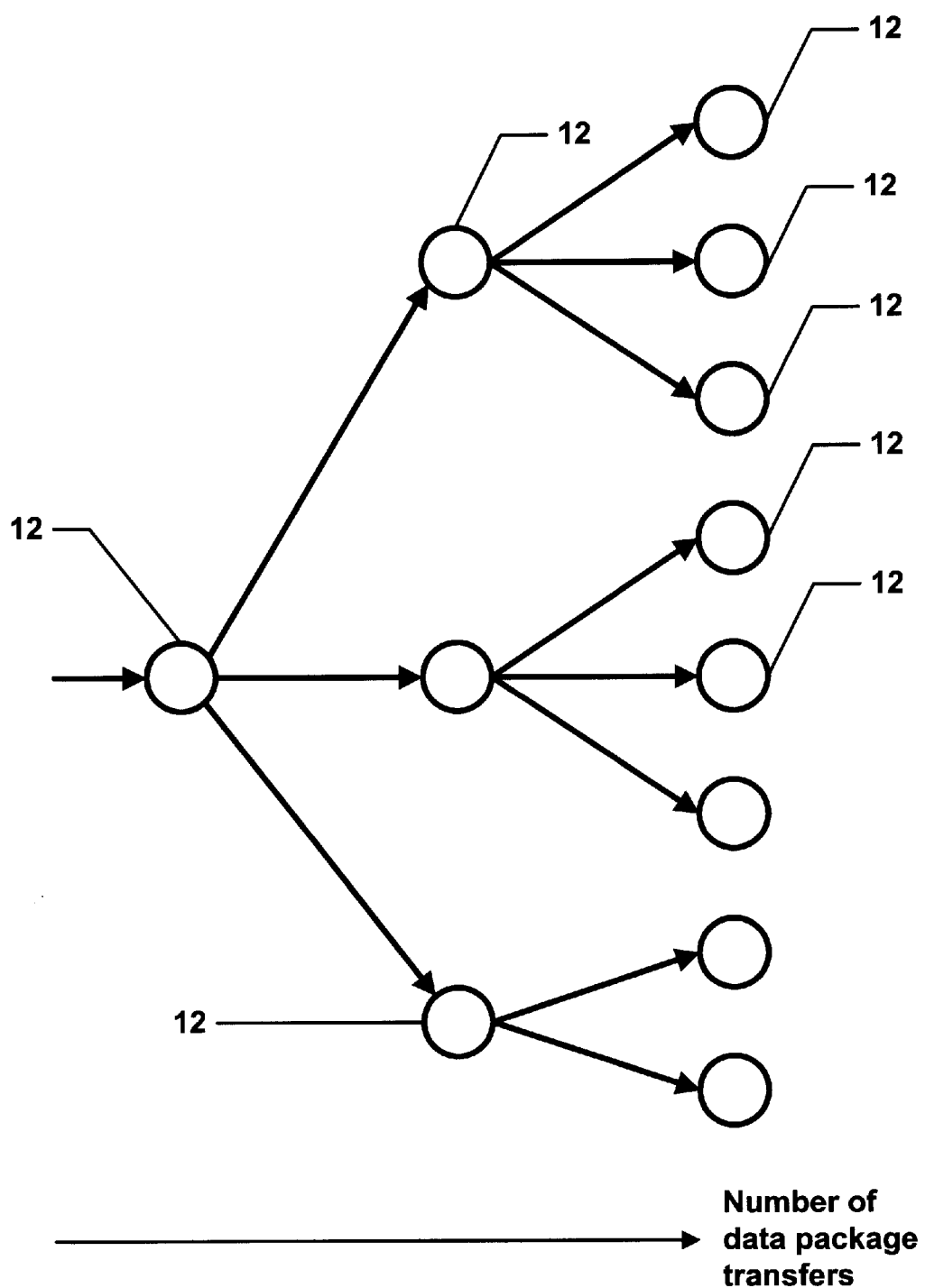
FIGURE 3: Tree-shaped data-flow (optimal)

| PVN | REQ | URL$_1$, URL$_2$, URL$_3$,... |

FIGURE 5A

| PVN | RSP | URL$_1$, URL$_2$, URL$_3$,... |

FIGURE 5B

DISTRIBUTED CLIENT-BASED DATA CACHING SYSTEM

This application is a continuation of Ser. No. 09/166,686, filed Oct. 5, 1998, now abandoned.

FIELD AND BACKGROUND OF THE INVENTION

The present invention relates to a distributed client-based data caching system. Specifically, the system of the present invention enables data packages to be served to a client through a flexible, non-deterministic distributed system of peer clients which cache the data packages, in order to maximize efficiency and speed for serving the data package to the client.

Networks which connect two or more computers, such as the Internet or intranets, enable client computers to obtain data packages, such as documents, images, messages, data packages or other types of data, from remote storage media which are not installed on the client computer itself. Instead, these remote storage media are managed and operated through a remote computer, known as a server computer or simply as a "server" (in the same vein, the client computer is also often termed only a "client"). The advantage of such a system is that the client computer can potentially obtain data from any server on the network. The disadvantage of the system is the requirement for sufficient bandwidth on the network to enable data to be transmitted from the server to the client. Furthermore, if the load is not evenly distributed between servers on the network, one server may become overwhelmed with requests, thereby decreasing the speed and efficiency of retrieval. Thus, currently many networks cannot provide rapid and efficient data retrieval due to the heavy demands placed upon the available bandwidth.

Proxy servers are often installed to conserve bandwidth on an Internet connection or on connections to other LANs (local area networks). These proxy servers cache frequently accessed data, thereby reducing the load on the main server, and distributing demand for bandwidth more evenly across the network. Unfortunately, such proxy servers are typically expensive to maintain. Furthermore, proxy servers require dedicated computers to be installed and configured. Each computer on the LAN has to be separately configured in order to communicate with the proxy server. Such configuration is deterministic, such that each client must be configured to communicate with each proxy server separately. Thus, proxy servers have many drawbacks.

A more useful solution would enable Intranets to reap the benefits of the proxy server, without requiring dedicated machines and without requiring any special installation or configuration. Furthermore, such a solution would not be deterministic, such that each client could communicate with more than one server according to the load on each server, rather than according to the configuration of the client itself. Unfortunately, such a solution is not currently available.

Therefore, there is an unmet need for, and it would be highly useful to have, a distributed client-based data caching system which enables data to be stored and retrieved from a plurality of peer clients, or "caching entities", yet which does not require any special configuration or installation of separate servers.

SUMMARY OF THE INVENTION

The present invention is of a distributed client-based data caching system, which enables data to be served to a client through a flexible, non-deterministic distributed system of caching entities, in order to maximize efficiency and speed for serving the document to the client. The caching entities are peer clients which serve the data to each other, thereby reducing the amount of bandwidth required to obtain data from an external server.

According to the present invention, there is provided a method for distributing data packages across a network, the network featuring an external server for serving at least one data package, the external server being a dedicated server, the steps of the method being performed by a data processor, the method comprising the steps of: (a) providing a plurality of peer clients attached to the network and a list of data packages being stored by each of the plurality of peer clients, each data package on the list of data packages having an entry, the entry indicating a unique identifier for the data package and a location of the data package in at least one of the plurality of peer clients; (b) examining the list of data packages by a first peer client to find an entry for a data package; and (c) if the entry for the data package is present on the list of data packages of the first peer client, retrieving the data package from the location at another of the plurality of peer clients according to the entry for the data package.

Alternatively, the list of data packages is stored on the external server.

According to preferred embodiments of the present invention, the list of data packages is stored on at least the first peer client. Preferably, if alternatively the entry for the data package is absent from the list of data packages of the first peer client, the method further comprises the steps of: (d) sending a request message for the data package by the first peer client to at least one other peer client; and (e) if a response message is received by the first peer client from the at least one other peer client, retrieving the data package from the at least one other peer client by the first peer client.

Preferably, the request message and the response message are transmitted to the plurality of peer clients by broadcasting. Alternatively, the request message and the response message are transmitted to the plurality of peer clients by multicasting. Also alternatively, the request message and the response message are transmitted to the plurality of peer clients by polling each peer client individually.

Also alternatively and preferably, if the response message is not received from the at least one other peer client by the first peer client, the method further comprises the step of: (f) obtaining the data package by the first peer client from the external server. Preferably, the method further comprises the step of sending a response message by the first peer client to the at least one other peer client substantially before the first peer client obtains the data package from the external server. More preferably, the list of data packages is stored on each of the plurality of peer clients, and the method further comprises the steps of: (g) receiving the response message from the first peer client by the at least one other peer client; and (h) altering the list of data packages being stored by the at least one other peer client for indicating the location of the data package according to the response message.

Alternatively, the list of data packages is stored on each of the plurality of peer clients, and the method further comprises the steps of: (g) receiving the response message from the first peer client by the at least one other peer client; and (h) altering the list of data packages being stored by the at least one other peer client for indicating the location of the data package according to a probabilistic function.

Preferably, the probabilistic function is performed according to a set of equations:

$$\text{New location} = \begin{cases} \text{Old location} & Po(x) = 1/(\text{generation}+1) \\ \text{New location} & Pn(x) = 1 - 1/(\text{generation}+1) \end{cases}$$

wherein Pn(x) is a probability that the new location is substituted for the old location, Po(x) is a probability that the old location is retained, and "generation" indicates how many times the location had been previously changed.

Also preferably, an upper limit is predetermined for a number of the plurality of peer clients served substantially simultaneously by the at least one other peer client, such that if a number of the plurality of peer clients served substantially simultaneously by the at least one other peer client is greater than the upper limit, the method further comprises the step of: (d) sending a busy message from the at least one other peer client to the first peer client.

Preferably, the external server is a Web server, and the plurality of peer clients is a plurality of Web browsers.

Also preferably, the external servis a BackWeb™ server, and the plurality of peer clients is a plurality of BackWeb™ clients.

Preferably, the unique identifier for the data package is an MD5 digest of the data package.

According to still other preferred embodiments of the present invention, the step of retrieving the data package is performed according to a protocol based on TCP/IP. Preferably, the protocol is HTTP. Alternatively and preferably, the protocol is FTP.

Hereinafter, the term "protocol based on TCP/IP" includes any such protocol, including but not limited to the HTTP (hypertext transfer protocol) and FTP (file transfer protocol) protocols.

Hereinafter, the term "data package" refers to any discrete, identifiable unit of data, including but not limited to documents, images, messages, data packages or any other type of data.

Hereinafter, the term "computing platform" refers to a particular computer hardware system or to a particular software operating system. Examples of such hardware systems include, but are not limited to, personal computers (PC), Apple Macintosh™ computers, mainframes, minicomputers and workstations, which are also non-limiting examples of data processors for operating a software application under an operating system. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™"), Windows95™ and Windows98™.

For the present invention, a software application could be written in a substantially suitable programming language, which could easily be selected by one of ordinary skill in the art. The programming language chosen should be compatible with the operating system according to which the software application is executed. Examples of suitable programming languages include, but are not limited to, C, C++ and Java.

Hereinafter, the term "broadcast" may also include "multicast" as well.

BRIEF DESCRIPTION OF THE DRAWINGS

The invention is herein described, by way of example only, with reference to the accompanying drawings, wherein:

FIGS. 1A and 1B are schematic block diagrams of an exemplary basic system and method according to the present invention;

FIGS. 2A–2E are schematic block diagrams of an exemplary request/response protocol and method according to the present invention;

FIG. 3 is a schematic block diagram of an exemplary preferred data-flow diagram according to the present invention;

FIGS. 5A and 5B are exemplary request and response messages according to the present invention.

DESCRIPTION OF THE PREFERRED EMBODIMENTS

The present invention is of a distributed client-based data caching system, which enables data to be served to a client through a flexible, non-deterministic distributed system of caching entities, in order to maximize efficiency and speed for serving the data to the client. The caching entities are peer clients which serve the data to each other, thereby reducing the amount of bandwidth required to obtain data from an external server.

The system of the present invention enables clients to share data packages among themselves across their local network neighborhood, for example within a LAN, thereby eliminating the need for a specialized proxy server. Furthermore, the network traffic is not significantly affected, since modern network architectures are well suited for peer-to-peer communications. Most currently operating networks have a star topology, using switching hubs, in which communication between two peers does not affect simultaneous communication among other nodes on the network. Thus, the system of the present invention overcomes the drawbacks of a proxy server, yet does not add significant loads to the traffic on the network itself.

For currently available client-server software applications known in the art, whenever a client requires a data package, the following algorithm is performed. First, the software application attempts to locate the data package locally on the memory or on the disk or disks of the client. Then, if the data package is not found locally, the software application retrieves the data package from the appropriate server.

By contrast, the operation of the system of the present invention adds an intermediate step. For the present invention, if the data package is not found locally, an attempt is made to retrieve the data package from a peer client on the local network "neighborhood" before resorting to retrieving the data package from the server.

Thus, for the system of the present invention, every client actually functions as a caching proxy. Once a client requires a data package, it queries all the hosts, which are actually peer clients, on the local network for that data package. If no neighboring peer client has the data package, the client retrieves the data package from the external server as usual. However, if a neighboring client already has the required data package, the requesting client will download this data package from the peer client rather than from the external server.

The principles and operation of the distributed client-based data caching system according to the present invention may be better understood with reference to the drawings and the accompanying description.

Figure 1A:
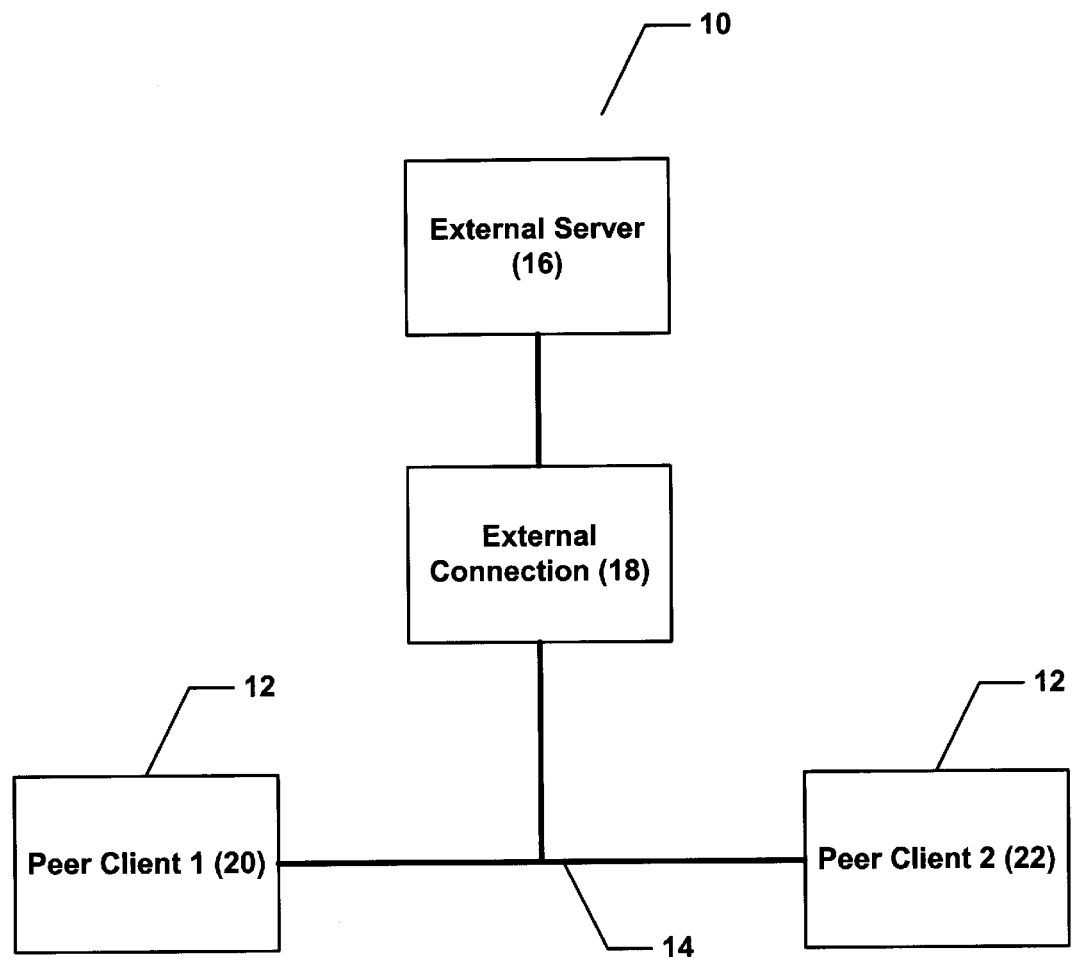

FIG. 1A is a schematic block diagram of an exemplary system according to the present invention, while FIG. 1B is a flowchart of the operation of the system of FIG. 1A. FIG. 1A shows a system 10 which includes a plurality of peer clients 12 connected by a local network 14 of some type, for example a LAN, indicated by the heavier line in FIG. 1A. Two peer clients 12, labeled as "peer client 1" 20 and "peer client 2" 22, are shown for the purposes of illustration only and without intending to be limiting in any way. Each peer client 12 is also connected to an external server 16 of some type by an external connection 18. Although only one external server 16 is shown, a plurality of external servers could also be implemented. External server 16 is a dedicated server, in the sense that this server has a primary or at least a substantially significant role as a server for data packages. As shown for the purposes of illustration, external connection 18 only connects to local network 14 at one point, although multiple such external connections could also be implemented (not shown). In addition, external connection 18 could also optionally connect each peer client 12 directly to server 16 (not shown).

The operation of system 10 according to the present invention is illustrated with reference also to FIG. 1B. In step 1, peer client 12, such as peer client 12 looks for a data package in the local memory or disk cache of that particular peer client 12. If the desired data package is not found on the local disk cache, then in step 2, peer client 12 queries any other peer client(s) 12 on local network 14 to determine whether any other peer client 12 has a particular data package. For example, peer client 20 could query peer client 22, to determine whether peer client 22 has the desired data package. In step 3a, if peer client 22 has the desired data package, then peer client 20 obtains the data package from peer client 22. Alternatively, as shown in step 3b, if peer client 22 does not have the desired data package, then peer client 20 obtains the data package from server 16 through external connection 18. Thus, every peer client 12 is also potentially a server which is internal to local network 14, and hence could be described as an "internal server" to distinguish peer client 12 from external server 16.

Each peer client 12 could also be described as a "caching entity" and the data stored by each client for serving to other peer clients 12 as "cached data" or "cached data packages".

Figure 4:
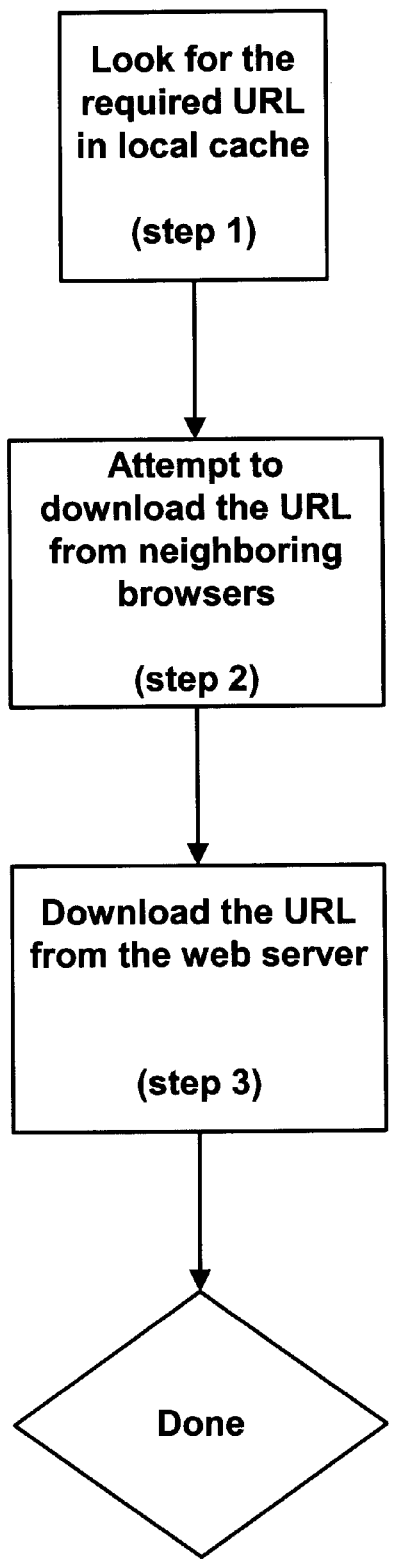
FIG. 4 is a flowchart of a method for operating the system of the present invention with Web browsers.

A number of different possible embodiments of the system of the present invention can be implemented, of which two illustrative embodiments are shown with reference to theFigures below. Briefly, FIGS. 2A–2D illustrate an exemplary embodiment of the system of the present invention for implementation with the software application of Back-Web™ (BackWeb Technologies Ltd., Ramat Gan, Israel) on a local area network (LAN). FIGS. 4 and 5A–5B illustrate an exemplary embodiment of the system of the present invention for implementation with a Web browser software application on the Internet.

FIG. 2A shows an exemplary local network 24 which features a plurality of peer clients 12 of which three are shown for the purposes of discussion only and without intending to be limiting in any way. For the purposes of discussion only, suppose a peer client 26, labeled "A", wishes to obtain four data packages "W", "X", "Y" and "Z". None of these data packages are local to peer client 26, which must therefore obtain these data packages from either another peer client 12 as an internal server, or from an external server (not shown). Local area network 24 features two other peer clients 12: peer client 28, labeled "B", and peer client 30, labeled "C". Peer client 26 must therefore first communicate a request to peer client 28 and peer client 30 to see if the desired data packages are available at either location, and then peer client 26 must obtain these data packages from peer client 28 or peer client 30 if the desired data packages are available.

Preferably, two protocols are used for communication between peer clients on a local area network (LAN), a data package-exchange protocol and a control protocol. Specifically, the data package exchange protocol is used to transfer data packages between peer clients, once the desired data package has been located, and is described in greater detail with respect to FIG. 2B below. The control protocol enables each peer client to efficiently build and maintain tables which describe the location of available data packages across the local area network, by exchanging messages.

Each peer client maintains two hash-tables which contain information about data package location: a local-data packages table and a network-data packages table. The local-data packages table is a hash-table of data packages which reside on the storage medium or media of the peer client itself. The network-data packages table is a hash-table of data packages which reside on the storage medium or media of other clients on the local network. This table contains the local area network address of the peer client on which each data package is being stored. The size of this hash-table is preferably limited in order to reduce memory consumption. More preferably, each entry in the table has a time-stamp, such that older entries are purged when the size of the table exceeds the upper permissible limit.

In order to effectively identify the desired data package, preferably each data package has a unique identifier or "fingerprint" associated with it. More preferably, this unique identifier is an MD5 digest of the content of the data package (for a description of the MD5 specification, which is an industry standard and would therefore be obvious to one of ordinary skill in the art, see "RFC 1321" at http://ds.internic.net/rfc/rfc1321.txt).

Once any peer client knows both the unique identifier and the location of the data package on the local network, that client can then proceed to download the data package. However, the peer client may not know the location of the desired data package, in which case the client must follow a control protocol according to the present invention in order to determine the location of the desired data package and to enable the client to build these hash tables with respect to future attempts to locate a data package.

The control protocol is used to provide each client with knowledge about the locations of data packages across the local network. In the preferred implementation illustrated with respect to FIGS. 2A–2D, control messages are preferably sent and received as broadcast or multicast packets. Local area networks such as Ethernet networks support broadcast or multicast packets such that all peer clients on a local area network receive the broadcast or multicast packets. Effectively, a single packet can be sent to all peer clients by using broadcast or multicast, thereby reducing the amount of traffic on the network required as a result of transmitting the request message (see for example Chapter 12, "Broadcasting and Multicasting", of *TCP/IP Illustrated Volume*, by W. Richard Stevens, Addison-Wesley, 1994). However, optionally the system of the present invention could poll each peer client individually with a control message for that peer client, although this is not preferred since such individually addressed messages would consume excessive amounts of available bandwidth. In such a situation, preferably polling would be restricted to a certain group of peer clients as internal servers, in order to reduce the amount of traffic on the local area network.

For the preferred implementation in which broadcast or multicast is used, more preferably, the decision to select either IP multicast or broadcast is made according to the configuration set by the network administrator for the local area network. IP multicast is preferable in terms of load on the clients of the local network, but may not be supported on all platforms (operating systems). More preferably, the TTL or Time to Live may be configured. The TTL specifies the number of routers a packet can cross before being dropped. Configuring the TTL enables data package sharing to be expanded across subnet boundaries.

Figure 2B:
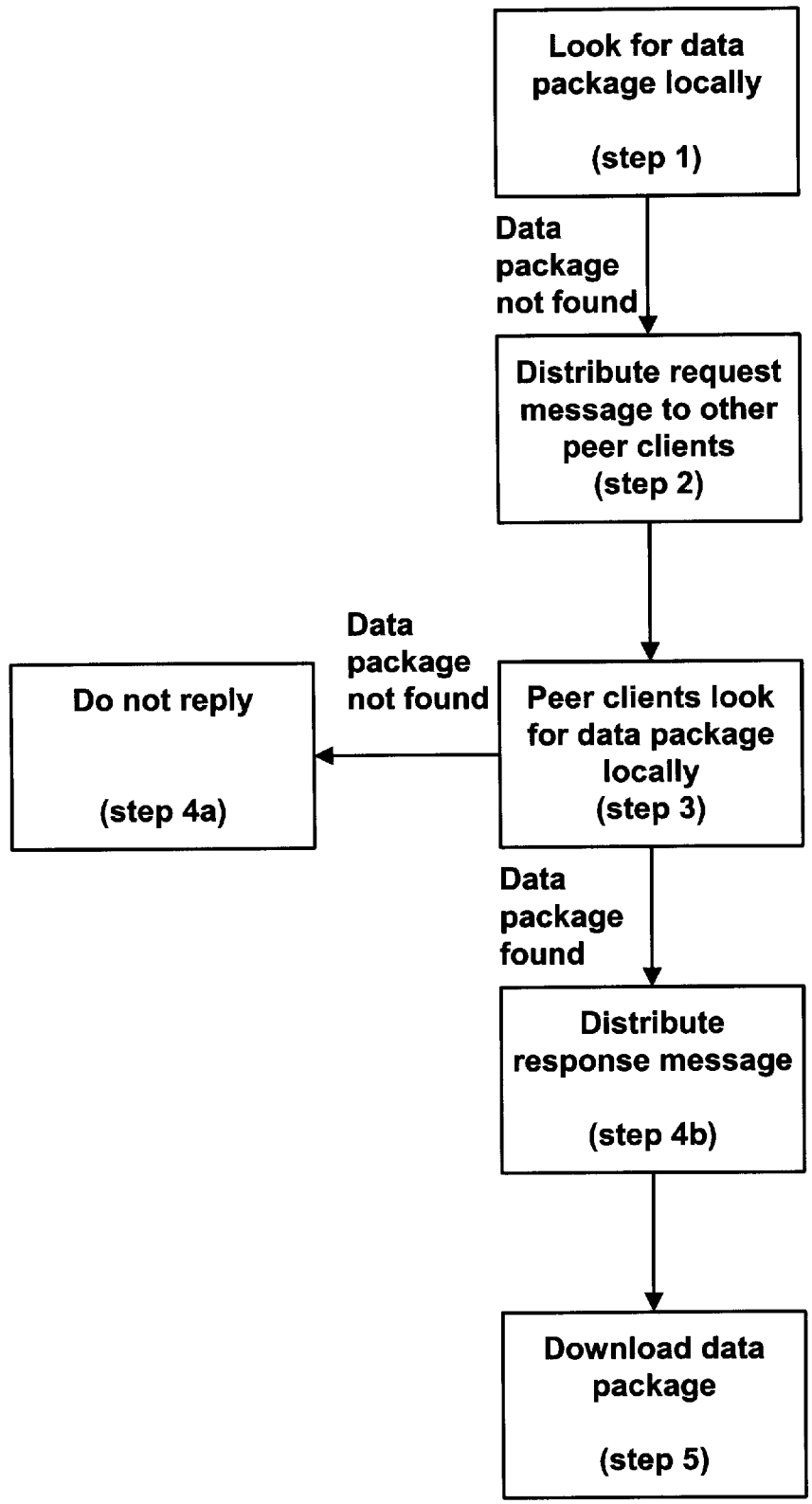

As shown with respect to FIG. 2B, the control protocol of the present invention preferably operates as follows. In step 1, peer client "A" from FIG. 2A looks for a data package on the local storage medium or media. In step 2, since the data package was not found locally on the medium or media of peer client "A", peer client "A" must download the data package and therefore preferably multicasts (or alternatively broadcasts) a request message. A request message preferably contains a protocol identifying version number (PVN) for the control protocol of the present invention and a list of MD5 digests of the needed data packages, as shown in FIG. 2C.

Optionally and preferably, if more than one data package is desired, a list of requested data packages is included in the request message rather than a single MD5 digest, in order to reduce the total number of request messages on the network.

In step 3, the neighboring clients, shown as peer clients "B" and "C" in FIG. 2A, receive this request message and search for the requested data package in their local-data packages hash-table. A peer client which does not find the data package locally does not reply, as shown in step 4a. Otherwise, in step 4b the peer client sends a response message, preferably after waiting a short random time interval to determine whether another peer client will respond first. More preferably, the peer client does not distribute the response message if another client responded previously, in order to reduce unnecessary traffic on the local area network. Also more preferably, the peer client distributes the response message by broadcast or multicast.

For example, as shown in FIG. 2A, if peer client "A" requests a data package "W", peer client "B" would reply with the response message, since peer client "B" has the data package stored locally. By contrast, peer client "C" would not reply with a response message, since peer client "C" does not have data package "W" stored locally. On the other hand, if peer client "A" requests a data package "X", both peer client "B" and peer client "C" could respond. In this situation, preferably only peer client "B" or peer client "C" would respond, depending on which peer client had the shorter random interval for waiting before sending the response message.

More preferably, responses are sent only for data packages with yet unknown locations. For example, suppose client "A" requests data packages "W", "X", "Y" and "Z". Client "B" has data packages "W", "X" and "Y", and is the first to r, with a reply message indicating possession of data packages "W", "X" and "Y". Suppose another client, "C" has data packages "X", "Y" and "Z". Since it replied after client "B", the response message from client "C" will only indicate possession of data package "Z" because this is the only data package with an as yet unknown location.

A response message optionally contains the identifying PVN, the list of MD5 digests of data packages that were found and a TCP port number, as shown in FIG. 2D. The port number identifies on which TCP port the responding peer client is waiting for data package requests. Alternatively, the response message optionally contains other indicators which enable the requesting client to retrieve one or more data packages from the responding peer. Preferably, response messages are also be broadcast for data packages which are currently being downloaded from an external server, for reasons described in greater detail below.

In step 5, the peer client downloads the data package or data packages. In principle, according to a relatively simple embodiment of the present invention, at this stage the requesting client either receives a reply and downloads the data packages from the client that replied; or, if a reply is not received within a certain period of time, proceeds to download these data packages from an external server. If the peer client is downloading a data package from another peer client as an internal server, the data package-exchange protocol is used to obtain the data package. The data package-exchange protocol is based on some appropriate peer-to-peer communication protocol, including but not limited to the HTTP protocol (see RFC-2068, "Hypertext Transfer Protocol-HTTP/1.1", available from http://ds.internic.net/rfc/rfc2068.txt as of Sep. 23, 1998).

Preferably, a more complex implementation is employed, since such a simple implementation may cause multiple clients to fetch the same data packages from the external server simultaneously. This situation would arise if several peer clients need to download the same data packages at approximately the same time, which is a very probable scenario for push clients for which content delivery is triggered by an external server, since none of these clients would receive a response to its request. Instead, the other clients would still be downloading the data package when the new client request is broadcast, such that none of them would be ready to serve these data packages. Thus, many or even all of the clients would attempt to retrieve the data package from the external server and not from another peer client, thereby increasing the amount of traffic on the network and reducing the efficiency of operation of the system of the present invention.

Figure 2E:
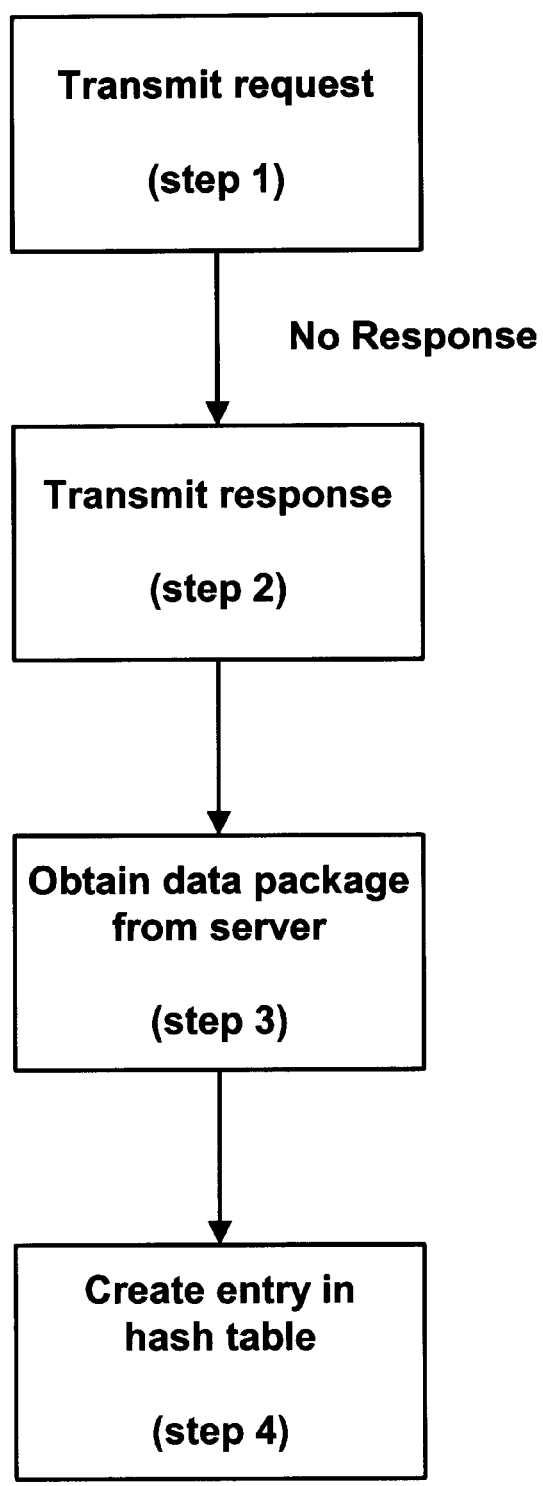

Preferably, the problem is solved by notifying other clients when a first client is downloading the data package from the external server, even if the process of retrieving the data package is not yet complete. In this preferred embodiment, the first client which requires the data package obtains the data package from the external server. Other clients which require the data package will then download it from the first client, even if the first client is still in the process of retrieving the data package from the external server. The preferred embodiment of the method of the present invention is described in greater detail with regard to FIG. 2E.

In step 1, the requesting client again transmits the request, again preferably by broadcasting or multicasting, and then waits for a response. If no response is received within a certain period of time, in step 2 the client transmits a response message as if replying to its own request, indicating that this client either has the data package, or in this case, that the client is retrieving the data package. In step 3, the client retrieves the data package from the external server.

In step 4, other clients create an entry in their network data packages hash table, indicating the location of the client which will be serving the data package. Thus, preferably only a single client accesses the external server for any given data package.

If a request is sent for multiple data packages, but a response is received indicating the location of only some of the data packages at a neighboring peer client or clients, the client first obtains these data packages from the neighboring peer client or clients. Next, the client then transmits the response message for the rest of the data packages, and proceeds to obtain the remaining data package or data packages from the external server. Thus, the client only obtains the data package or data packages from the external server which are not available locally, rather than obtaining all of the data packages from the external server, thereby reducing network traffic.

According to preferred embodiments of the present invention, preferably the process of downloading data package from peer clients is optimized to reduce the amount of time required for downloading, the load on each individual client and the overall network traffic. Such optimization is performed as follows.

First, preferably the exit degree of each client is bound, such that each client is only able to serve a fixed, limited number of other clients simultaneously. More preferably, the default limit is three other clients, for example, or some another appropriate number which is preferably configured by the user or by the network administrator. If an additional client attempts to download a data package from a client which is already serving the maximum number of other clients will receive a "busy" message. This feature limits the load on each individual client.

Also preferably, the present invention is able to optimize the selection of the best client from which the data package should be obtained. For example, if client "A" had already downloaded a larger portion of the required data package than client "B", transferring the data package from client "A" is more optimal. Such clients are preferentially selected to serve data packages, since these clients will be able to serve the data package after a shorter time period has elapsed. Such preferential selection occurs by shortening the time period for waiting before these clients respond, thereby increasing the likelihood that they will serve the data packages. For this reason, the client preferably calculates the random delay before responding such that the delay is inversely proportional to the percentage of the data package which has been already downloaded. In addition, the random delay is preferably proportional to the number of clients being served at the moment, in order to decrease the likelihood of overloading already busy clients.

In addition, according to other preferred embodiments of the present invention, preferably the entries of the locations of data packages in the network data packages table are updated according to a probabilistic function. Such a function is preferred in order to prevent all of the clients from registering a single client as the server for any particular data package, for example. When different clients respond, usually at different times, indicating they have a specific data package, the remaining clients listening across the network update the entry for this data package in their network data packages table, by adding the IP address, or some other type of address according to the addressing system employed by the network, of the client which can serve the data package to this table. In a simple implementation, the clients would store only the last advertised location of each data package, and therefore many or all clients might attempt to obtain the data package from a single client as the internal server, thereby overloading that client.

To avoid this situation, preferably the following probabilistic algorithm is used to determine the particular client address which is stored in the network data packages table. Each time a new client transmits a response message, indicating that this client is able to serve particular data package, the probability that the new IP address of the new client is substituted for the old IP address is calculated according to the following equations:

$$\text{New IP address} = \begin{cases} \text{Old IP address} & Po(x) = 1/(\text{generation}+1) \\ \text{New IP address} & Pn(x) = 1 - 1/(\text{generation}+1) \end{cases}$$

wherein $Pn(x)$ is the probability that a new IP address is substituted for the old IP address, $Po(x)$ is the probability that the old IP address is retained, and "generation" is a number indicating how many times this address had been previously changed.

For example, if client "A" responds indicating it has data package "X", then initially all other peer clients store the IP address of client "A" as the location of data package "X". If client "B" then broadcasts a response also indicating that client "B" has data package "X", then the probability that any one client now changes the IP address for the location of data package "X" is 50%. In other words, about half of the clients should now point to client "A" and about half should point to client "B".

Such a substantially even distribution of load across multiple clients should produce data-flow with a tree-shaped topology, as shown in FIG. 3, rather than a random topology, thus optimizing the average download time and the load on the serving clients.

Furthermore, if any client requests a particular data package during the period required by client "A" for downloading that package, preferably client "A" sends a broadcast or multicast message indicating that the package is in the process of being downloaded. Therefore, preferably only a single client "B" polls client "A" for each data package, for example. Other clients preferably automatically receive any responses from that polling action through the broadcast or multicast transmission, and thus will not be forced to poll for themselves.

The polling (request/response) traffic is optimized since there is usually no need to transmit both a request and a response for each data package needed by each client. Such optimization is possible since each client preferably receives substantially all of the request/response communication of all the other clients and "remembers" the location of the data packages in the network-data packages table.

As previously described, the actual process for receiving a data package from an internal server is performed according to the data package exchange protocol, by using the HTTP protocol or some other suitable peer-to-peer communication protocol. The data package transfer software application of the present invention preferably features a timer, for detection of an aborted transfer or a very slow data package transfer, for example. The timer determines when such a transfer has timed out. If a time-out occurs, the requesting client preferably repeats the whole process. If the transfer remains unsuccessful after a plurality of attempts, the client preferably ceases to attempt to transfer the data package from the peer client as the internal server, and instead transfers the data package or data packages directly from the external server.

Again, as described previously, if a requested data package has not yet finished being downloaded by a peer client, the requesting client receives a message indicating that the data package is not ready, as well as an indication of the fraction of the data package already downloaded. The requesting client continues polling the serving client until the data package download is complete. If the download becomes substantially slower or is otherwise interrupted or terminated for a long period of time, the requesting client behaves as if a time-out occurred.

According to additional preferred features of the present invention, substantially automatic detection of peer clients is supported. Such automatic detection enables each peer client to detect the presence of other peer clients on the network. If such peer clients are not found, preferably the system of the present invention is disabled, since the operation of the system as described above would only prolong the time period required to download a data package if no other peer clients are available.

Preferably, the amount of bandwidth on the local area network which is consumed by each peer client serving data packages to other clients is limited, to avoid over-burdening any specific host. This limit is preferably configurable by the user or by the network administrator.

Furthermore, in order to protect peer clients from unauthorized access of local storage media through the system of the present invention, certain security features are preferably included. For example, preferably only data packages identified in the hash tables are able to be transferred from the client. Thus, transmitted data packages are preferably only data packages which were intended to be served to the peer clients, such that malicious users preferably cannot use the system of the present invention to obtain "random" data packages from the storage media of a peer client. Data packages are more preferably only referenced by their unique identifier, such as their 128-bit MD5 digest, such that a data package is only able to be downloaded from a client if the intended recipient knows this digest. Thus, the name of a data package alone is preferably not sufficient information to permit retrieval of the data package from a peer client.

According to another embodiment of the present invention, the system of the present invention is also applicable to Web browsers, FTP clients, and other software applications involving client-server data-transfer. As described with reference to FIGS. 4 and 5A–5B, another exemplary embodiment of the present invention is used for caching Web content.

In step 1 of FIG. 4, a Web browser being operated by a client computer requests a specific data package. First the Web browser looks at the local cache, as is known to one of ordinary skill in the art. If the data package is found in the local cache, then that data package is retrieved from the local cache. Otherwise, the Web browser issues a message requesting this data package, preferably by using broadcast or multicast message transmission. The data package is preferably uniquely defined by a unique identifier. More preferably, the unique identifier is the URL of the data package, or alternatively and preferably a combination of the URL of the data package and timestamp, or by any other suitable unique identifier.

For optimization, if more than one data package is required, the Web browser preferably transmits one request message containing the list of needed data packages, thereby reducing the total network traffic across the network. Such a situation may arise if, for example, the Web browser had just parsed an HTML (hypertext mark-up language) document, or Web page, which contains many links to follow. Preferably and optionally, each request message contains an identifying "magic number", which may contain the protocol version (PVN). For instance: "V1.0". As shown in FIG. 5A, the request message includes the list of URL's or other unique identifiers to identify the data package or data packages being requested, which is similar in function to the list of MD5 digests described previously for request messages, and a unique identifier identifying the request message, shown as "REQ".

In step 2, other Web browsers across the network listen to detect request messages of this type. These Web browsers, which are peer clients for this embodiment of the present invention, receive this request message and check their own cache for the requested URL. If the requested URL is found in the local cache of a Web browser, that Web browser preferably waits a random interval and then preferably transmits a response message indicating it has the required data package (or data packages). Preferably, the message is broadcast or multicast. More preferably, that Web browser does not reply if another Web browser had replied first. A reply message is preferably sent by a particular Web browser even if the requested URL is still being downloaded by that Web browser.

In step 3, if no response to an issued requmessage is received within a certain amount of time, for example 5 seconds, then the process is preferably timed out. In this case, the Web browser preferably no longer attempts to obtain the URL from another Web browser, and the URL is obtained from the regular Web server using regular HTTP protocol. Before starting to download the data package from the regular Web server, the Web browser preferably transmits a response message indicating that this particular Web browser is downloading the data package.

On the other hand, if a response message is received, the Web browser obtains the URL from the other Web browser which indicated that it had the URL in the local cache. Preferably, Web browsers across the network record the URLs and the address from which the response message originated for future use, such that these Web browsers would be able to download the URL at a future time without first transmitting the request message.

Once the Web browser is able to locate a data package on a neighboring Web browser, the Web browser attempts to download the data package. The downloading process is performed with a suitable data-transfer protocol, such as HTTP or FTP. If a time-out or other failure occurs during the processing of data package transfer, the receiving Web browser preferably performs substantially the entire procedure more than once. More preferably, the number of permitted attempts to retry the transfer is configurable. If the process fails after these attempts have been performed, preferably the Web browser transfers the required data package or data packages from the regular Web server.

According to preferred features of this embodiment of the present invention, data package downloading is well distributed, such that the Web browsers do not obtain a data package from only a single Web browser, but rather obtain the data package from a plurality of Web browsers. Such distribution is maintained as follows.

First, preferably the number of simultaneous data package transfers from a single Web browser is limited. If this number is exceeded, the Web browser transmits a "busy" message to other Web browsers attempting to transfer the data package. Next, preferably once a Web browser receives a message giving the location of a particular data package, the corresponding entry in the hash table for that data package is not altered every time another response message is received pertaining to this data package. The hash table is preferably altered by subsequent messages in a probabilistic manner, such that the probability that any particular entry is updated to indicate a new location of a data package is equal to 1/(generation+1), where 'generation' counts the number of times a response message was received for that data package.

For example, if Web browser "A" transmits a response message indicating that data package "X" is on the local cache, then initially all of the neighboring Web browsers have an entry in the hash table indicating that Web browser "A" is the location of data package "X". If Web browser "B" then transmits a response message for data package "X", then each Web browser preferably now alters the entry in the hash table to indicate a new location of data package "X" with a probability of about fifty percent, such that about fifty percent of the Web browsers now have an entry indicating that the data package is available from Web browser "A" and such that about fifty percent of the Web browsers now have an entry indicating that the data package is available from Web browser "B". Thus, a good load distribution can be achieved.

The random delay (mentioned in step 2 above) chosen by a browser is proportional to the number of currently served browsers, or the number of browsers currently downloading data packages from that browser, and inversely proportional to the amount of the data package already downloaded by it. This way the browsers more eligible to download from are more likely to be chosen by other browsers to serve these data packages.

While the invention has been described with respect to a limited number of embodiments, it will be appreciated that many variations, modifications and other applications of the invention may be made.

What is claimed is:

1. A method for distributing data packages across a network, the network featuring an external server for serving at least one data package, the external server being a dedicated server, the steps of the method being performed by a data processor, the method comprising the steps of:
   (a) providing a plurality of peer clients attached to the network and providing a list of data packages, said data packages being stored by each of said plurality of peer clients, each data package of said data packages having an entry in said list, said entry indicating a unique identifier for said data package and a location of said data package in at least one of said plurality of peer clients;
   (b) examining said list of data packages by a first peer client to find an entry for a required data package; and
   (c) if said entry for said data package is present on said list of data packages of said first peer client, retrieving said data package from said location at another of said plurality of peer clients according to said entry for said data package.

2. The method of claim 1, wherein said list of data packages is stored on the external server.

3. The method of claim 1, wherein said list of data packages is stored on at least said first peer client.

4. The method of claim 3, wherein alternatively said entry for said data package is absent from said list of data packages of said first peer client, the method further comprising the steps of:
   (d) sending a request message for said data package by said first peer client to at least one other peer client; and
   (e) if a response message is received by said first peer client from said at least one other peer client, retrieving said data package from said at least one other peer client by said first peer client.

5. The method of claim 4, the method further comprising the step of:
   (f) altering said list of data packages being stored by at least said first peer client for indicating said location of said data package according to said response message.

6. The method of claim 5, wherein said request message and said response message are transmitted to said plurality of peer clients by broadcasting.

7. The method of claim 5, wherein said request message and said response message are transmitted to said plurality of peer clients by multicasting.

8. The method of claim 5, wherein said request message and said response message are transmitted to said plurality of peer clients by polling each peer client individually.

9. The method of claim 5, wherein if said response message is not received from said at least one other peer client by said first peer client, the method further comprises the step of:
   (g) obtaining said data package by said first peer client from the external server.

10. The method of claim 9, further comprising the step of sending a response message by said first peer client to said at least one other peer client substantially before said first peer client obtains said data package from the external server.

11. The method of claim 10, wherein said list of data packages is stored on each of said plurality of peer clients, the method further comprising the steps of:
   (h) receiving said response message from said first peer client by said at least one other peer client; and
   (i) altering said list of data packages being stored by said at least one other peer client for indicating said location of said data package according to said response message.

12. The method of claim 10, wherein said list of data packages is stored on each of said plurality of peer clients, the method further comprising the steps of:
   (h) receiving said response message from said first peer client by said at least one other peer client; and
   (i) altering said list of data packages being stored by said at least one other peer client for indicating said location of said data package according to a probabilistic function.

13. The method of claim 1, wherein said probabilistic function is performed according to a set of equations:

$$\text{New location} = \begin{cases} \text{Old location} & Po(x) = 1/(\text{generation}+1) \\ \text{New location} & Pn(x) = 1 - 1/(\text{generation}+1) \end{cases}$$

wherein $Pn(x)$ is a probability that said new location is substituted for said old location, $Po(x)$ is a probability that said old location is retained, and "generation" indicates how many times said location had been previously changed.

14. The method of claim 10, further comprising the steps of:
   (h) receiving said response message from said first peer client by said at least one other peer client; and
   (i) retrieving said data package from said first peer client by said at least one other peer client substantially after said first peer client has obtained said data package.

15. The method of claim 1, wherein an upper limit is predetermined for a number of said plurality of peer clients served substantially simultaneously by said at least one other peer client, such that if a number of said plurality of peer clients served substantially simultaneously by said at least one other peer client is greater than said upper limit, the method further comprises the step of:
   (d) sending a busy message from said at least one other peer client to said first peer client.

16. The method of claim 1, wherein the external server is a Web server, and said plurality of peer clients is a plurality of Web browsers.

17. The method of claim 1, wherein the external server is a BackWeb™ server, and said plurality of peer clients is a plurality of BackWeb™ clients.

18. The method of claim 1, wherein said unique identifier for said data package is an MD5 digest of said data package.

19. The method of claim 1, wherein the step of retrieving said data package is performed according to a protocol based on TCP/IP.

20. The method of claim 19, wherein said protocol is HTTP.

21. The method of claim 19, wherein said protocol is FTP.

22. A method for distributing data packages across a network, the network featuring a server for serving at least one data package, and a plurality of peer clients for storing said data packages, the steps of the method being performed by a data processor, the method comprising the steps of:

(a) providing a list of said data packages stored by said plurality of peer clients, each of said data packages having an entry in said list, said entry including a unique identifier for said data package and a location of said data package within at least one of said plurality of peer clients;

(b) searching, at a first peer client, said list to find a particular entry at a second peer client for a required data package; and, (c) if said particular entry is found, retrieving, at said first peer client, said data package from said second peer client, according to said particular entry; and, (d) if said particular entry is not found, retrieving, at said first peer client, said data package from said server.

23. A method for distributing data packages across a network, the network featuring a server for serving at least one data package, and a plurality of peer clients for storing said data packages, the steps of the method being performed by a data processor, the method comprising the steps of:

(a) providing at each of said plurality of peer clients a local list of data packages stored by said peer client, each of said data packages having an entry in said local list;

(b) requesting, at a first peer client, a required data package;

(c) searching at a second peer client, said local list, to find a particular entry for said required data package;

(d) if said particular entry is found, retrieving, at said first peer client, said data package from said second peer client, according to said particular entry; and, (e) if said particular entry is not found, retrieving, at said first peer client, said data package from said server.

\* \* \* \* \*

(12) INTER PARTES REEXAMINATION CERTIFICATE (663rd)
United States Patent
Delaney et al.

(10) Number: US 6,374,289 C1
(45) Certificate Issued: Aug. 13, 2013

(54) DISTRIBUTED CLIENT-BASED DATA CACHING SYSTEM

(75) Inventors: Hubert Delaney, Wilton, CT (US); Adi Ruppin, Ramat Gan (IL); Lior Hass, Tel Aviv (IL); Ofer Faigon, Jerusalem (IL)

(73) Assignee: Transamerica Business Credit Corporation, Rosemont, IL (US)

Reexamination Request:
No. 95/000,538, Feb. 17, 2010

Reexamination Certificate for:
Patent No.: 6,374,289
Issued: Apr. 16, 2002
Appl. No.: 09/817,953
Filed: Mar. 26, 2001

Related U.S. Application Data

(63) Continuation of application No. 09/166,686, filed on Oct. 5, 1998, now abandoned.

(51) Int. Cl.
*G06F 13/00* (2006.01)

(52) U.S. Cl.
USPC .................................... 709/203; 707/E17.12

(58) Field of Classification Search
None
See application file for complete search history.

(56) References Cited

To view the complete listing of prior art documents cited during the proceeding for Reexamination Control Number 95/000,538, please refer to the USPTO's public Patent Application Information Retrieval (PAIR) system under the Display References tab.

*Primary Examiner* — M. Sager

(57) ABSTRACT

A system and method for enabling data package distribution to be performed by a plurality of peer clients connected to each other through a network, such as a LAN (local area network). Each peer client can obtain data packages from each other or from an external server. However, each peer client preferably obtains data packages from other peer clients, rather than obtaining data packages from the external server.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claim 15 is confirmed.

Claims 1, 3-5, 9, 16, 19-20, 22 and 23 are cancelled.

Claims 2, 6-8, 10-14, 17-18 and 21 were not reexamined.

\* \* \* \* \*